H. N. PACKARD.
FLUID METER.
APPLICATION FILED SEPT. 10, 1917.
1,282,926. Patented Oct. 29, 1918.
3 SHEETS—SHEET 2.
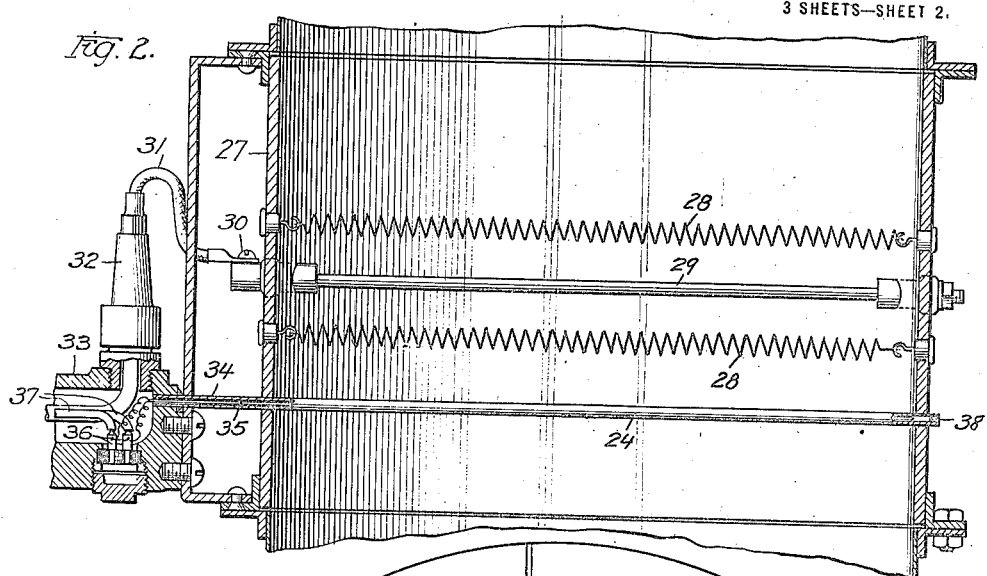
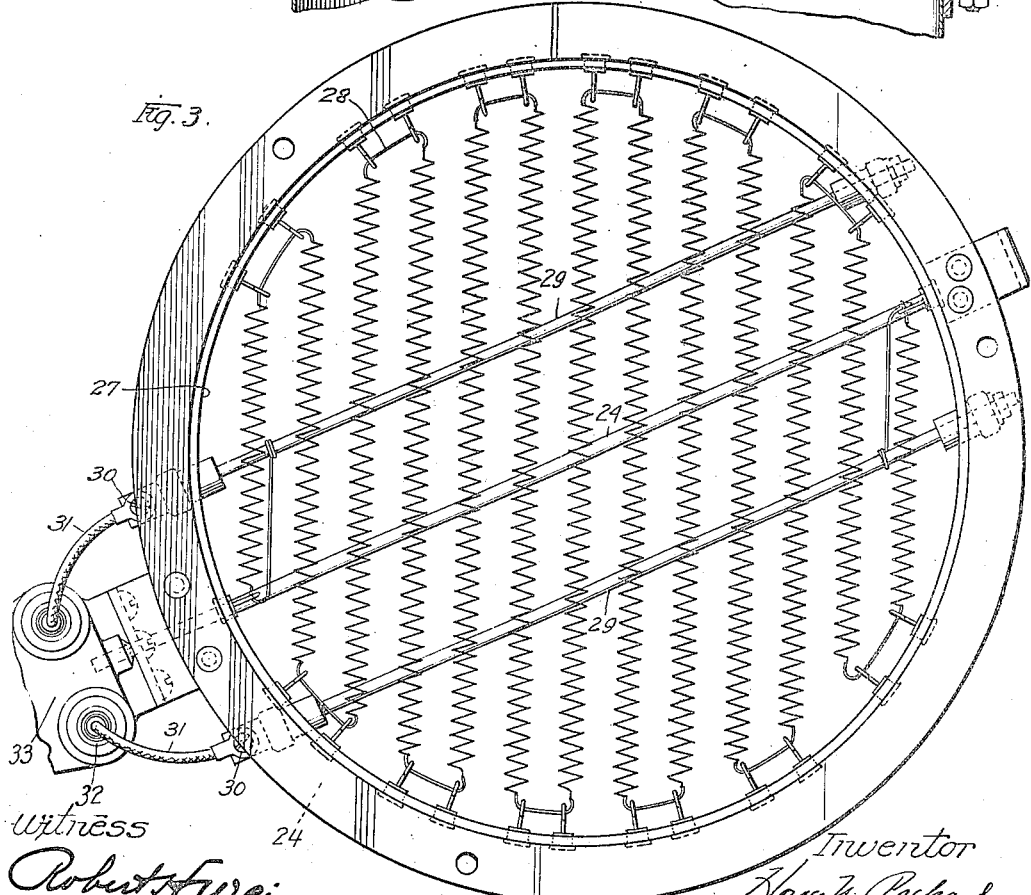

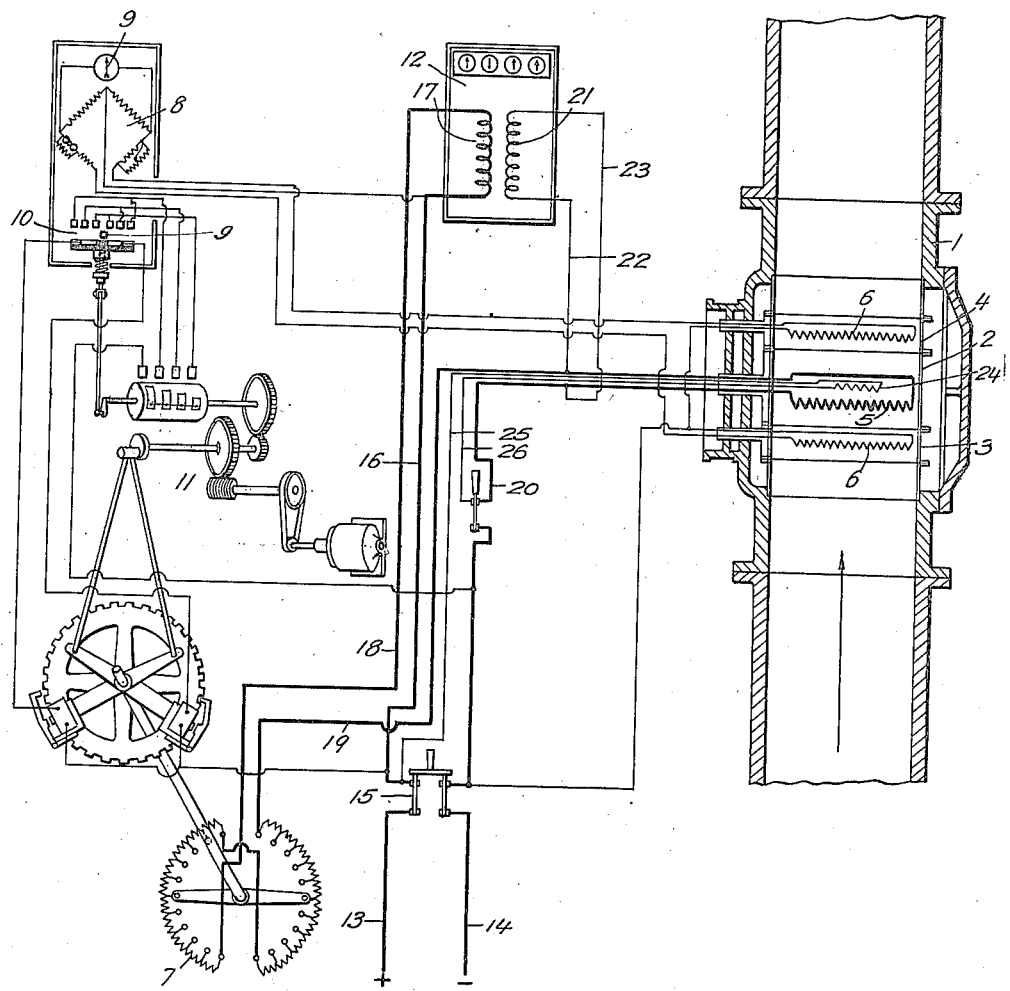

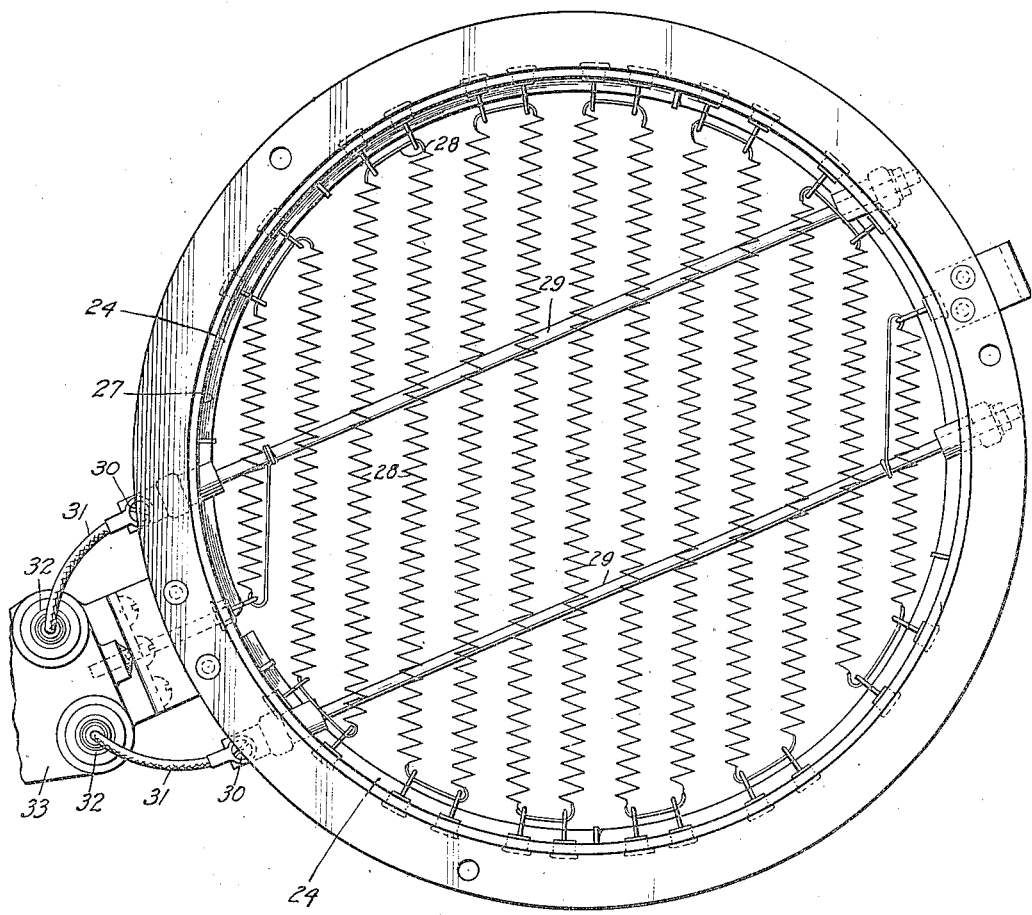

UNITED STATES PATENT OFFICE.

HORACE N. PACKARD, OF MILWAUKEE, WISCONSIN, ASSIGNOR TO THE CUTLER-HAMMER MFG. CO., OF MILWAUKEE, WISCONSIN, A CORPORATION OF WISCONSIN.

FLUID-METER.

1,282,926.

Specification of Letters Patent.

Patented Oct. 29, 1918.

Application filed September 10, 1917. Serial No. 190,542.

*To all whom it may concern:*

Be it known that I, HORACE N. PACKARD, a citizen of the United States, residing at Milwaukee, in the county of Milwaukee and State of Wisconsin, have invented new and useful Improvements in Fluid-Meters, of which the following is a specification.

This invention relates to fluid meters.

Meters have been developed for measuring the rate of flow of a fluid by causing a heat transfer between a body and the fluid and utilizing the effect of the heat transfer in determining the rate of flow of the fluid.

These meters usually comprise an electrical heater for imparting heat to the fluid and a thermometer resistance located on each side of the heater. The thermometer resistances act through automatic mechanism to control the supply of electrical energy to the heater to maintain a constant temperature rise in the fluid between the points where the thermometer resistances are located. If this be done, the electrical energy consumed by the heater in maintaining this constant temperature rise will be a measure of the rate of flow of the fluid.

In meters of the above described type, and in other thermal fluid meters, it has been found that heat losses take place which affect the accuracy of the meter. For instance, it seldom happens that all of the heat energy dissipated by the heater is transmitted to the fluid. Furthermore, some of the heat transmitted to the fluid is often lost before the temperature of the heated fluid is measured. These heat losses are probably due to the conduction of some of the heat through the walls of the meter and to radiation effects. In order to obtain accurate results with thermal fluid meters of the type to be herein described all of the heat dissipated from the heater should be transmitted to the fluid and none of the heat should be lost from the fluid before the temperature of the heated fluid is measured.

If all of the heat dissipated by the heater is not transmitted to the fluid, or if any of the heat be lost from the fluid before its temperature is measured, then some means should be provided to compensate for the heat energy which is lost.

One object of this invention is to provide a thermal fluid meter having means for compensating for heat losses that affect the accuracy of the meter.

Another object is to provide a thermal fluid meter having means for supplying to the fluid an additional amount of heat equal to the amount of the heat losses that affect the accuracy of the meter.

Another object is to provide a meter in which errors will not be introduced on account of undesirable heat losses.

Other objects will appear as the specification proceeds.

The invention is illustrated in the accompanying drawings, in which—

Figure 1 is a diagrammatic representation of a fluid meter constructed in accordance with the invention;

Fig. 2 is a vertical section through the heater unit of the meter;

Fig. 3 is a plan view of the heater unit; and

Fig. 4 is a plan view of a modified form of heater unit.

The invention has been illustrated in combination with a fluid meter of the type above described; that is, a fluid meter in which a pair of thermometer resistances acts through automatic mechanism to control the supply of electrical energy to the heater to maintain a constant temperature rise in the fluid between the points where the thermometer resistances are located. Fig. 1 diagrammatically represents a meter of this type, but it will be understood that the invention is applicable to thermal fluid meters of other types.

In Fig. 1 the housing of the meter is shown at 1. It is adapted to be connected to a gas main through which the fluid to be measured flows. An electrical heater unit 2 is positioned in the housing 1 and on each side of the heater unit is positioned a thermometer unit. One of these thermometer units is shown at 3 and the other is shown at 4. Each of the three units comprises a cylindrical frame across which is stretched the resistance wire. The resistance wire of the heater unit, which is diagrammatically represented at 5, is capable of dissipating heat to the fluid, while the resistance wire 6 of the thermometer units serves as a thermometer resistance in the well-known manner.

The controlling devices with which the heater and thermometer resistances are connected are illustrated and described in the patent to C. C. Thomas, No. 1,222,492, of April 10, 1917. These controlling devices will therefore not be described in detail. It will be sufficient for the present purpose to note that the energy supplied to the heater resistance 5 is varied by means of a rheostat 7 which in turn is automatically controlled by the thermometer resistances. The thermometer resistances are connected in a Wheatstone bridge 8 which is normally balanced; that is, if the heater 5 is imparting sufficient heat to the fluid to maintain a certain temperature rise in the fluid the relative ohmic resistances of the thermometer resistances 6 will be such that the Wheatstone bridge will balance. When the rate of flow of the fluid changes, the former amount of heat will not be the proper amount to maintain the same temperature rise in the fluid. Therefore, as the rate of flow varies, the amount of heat dissipated from the heater will have to be varied to maintain the temperature rise in the fluid constant. If the rate of flow of the fluid changes, the ohmic relation between the thermometer resistances changes, thus unbalancing the Wheatstone bridge. When the Wheatstone bridge is unbalanced it deflects the needle 9 of a galvanometer connected across the Wheatstone bridge. If the rate of flow of the fluid decreases the unbalancing of the Wheatstone bridge deflects the galvanometer needle 9 in one direction and if the rate of flow of the fluid increases the unbalancing of the Wheatstone bridge deflects the galvanometer needle 9 in the opposite direction. The galvanometer needle 9 constitutes a portion of an electrical switch denoted generally at 10, which in turn controls the automatic devices shown at 11 for varying the rheostat 7. The galvanometer needle 9 is deflected an amount corresponding to the amount of variation in the rate of the flow of the fluid, because the Wheatstone bridge is unbalanced an amount corresponding to the amount of variation in the rate of flow of the fluid. Therefore, if the rate of flow of the fluid changes but a small amount the rheostat 7 will be varied but a small amount. The rheostat 7 is varied just enough to vary the energy supplied to the heater so that the temperature rise in the fluid is maintained constant. If the rate of flow of the fluid decreases, the energy supplied to the heater is decreased. Therefore, the energy consumed by the heater in maintaining this constant temperature rise will be a measure of the rate of flow of the fluid. The energy thus consumed by the heater is measured by a wattmeter 12 which may be calibrated to read directly in terms of rate of flow of the fluid, if desired.

The electrical energy for the heater is supplied from the mains 13 and 14. The circuit of the heater may be traced as follows:— From the positive main 13 through the switch 15, conductor 16, through the current coil 17 of the wattmeter, conductor 18 to the rheostat 7, then through the conductor 19 to the heater, back through the conductor 20 and switch 15 to the negative main 14. The voltage coil 21 of the wattmeter 12 is connected across the heater by the conductors 22 and 23. It will therefore be seen that on account of these circuit connections the wattmeter 12 measures the energy consumed by the heater in maintaining a constant temperature rise in the fluid.

It should now be noted that if the heater dissipates any heat which is not transmitted to the fluid or if the fluid loses any of its heat before it passes the exit thermometer resistance, the lost heat will not affect the thermometer resistances, but will be registered by the wattmeter 12. This will obviously produce inaccuracies in the reading of the meter because all of the heat supplied by the heater should be transmitted to and retained by the fluid until its temperature rise is measured, inasmuch as the amount of heat dissipated by the heater is used in determining the rate of flow of the fluid.

It has been found in practice that some of the heat dissipated by the heater is lost and does not serve to heat the fluid and produce any effect upon the thermometer resistances. This loss of heat may be due to a number of causes, but it is believed to be chiefly due to radiation effects and to the conduction of some of the heat through the walls of the meter.

It has been found that this loss of heat is approximately the same regardless of the rate of flow of the fluid through the meter. In other words, the amount of heat lost when the fluid is flowing at a high rate is substantially the same as the amount of heat lost when the fluid is flowing at a lower rate. The amount of heat lost will vary for different meters, but the amount lost for any particular meter may be readily ascertained. Meters tested in practice have been found to have heat losses ranging from 1 to 15 watts. Of course, the heat loss might be found to be greater or even less than this amount.

Let it be assumed that the heat loss in a given meter amounts, in terms of electrical energy, to 3 watts.

If the fluid be flowing at the rate of 100,000 cubic feet per hour the number of watt-hours per hour supplied to the heater to raise the temperature of the gas a given amount, say two degrees, will be about 1,200. If three watthours per hour are lost then the error in the reading of the meter will be .25 of one per cent.

If the rate of flow is reduced to 50,000 cubic feet per hour and it takes 600 watt-hours per hour to raise the temperature of the fluid two degrees the three watthours per hour lost will produce an error of .5 of one per cent.

Similarly, if the rate of flow be 25,000 cubic feet per hour the error is one per cent.; at 12,500 cubic feet per hour the error is two per cent.; and at 6,250 cubic feet per hour the error is four per cent.

It will therefore be seen that the percentage of error increases as the rate of flow decreases.

As the number of watts lost is always the same regardless of the rate of flow of the fluid if some means be provided for supplying additional heat to the fluid at a constant rate equal to the rate at which the heat is lost due to the above mentioned and similar causes, the above mentioned error in the reading of the meter will be eliminated.

The meter is therefore provided with an auxiliary heater 24 which is connected by means of conductors 25 and 26 to the supply mains. The auxiliary heater is therefore supplied with a substantially constant amount of electrical energy. It is important to note that the energy consumed by the auxiliary heater 24 is not measured by the wattmeter 12 as it is the function of the auxiliary heater to compensate for the heat lost by the main heater and lost from the fluid before its temperature rise is measured. The heat transmitted to the fluid by the auxiliary heater, however, affects the thermometer resistances and the ultimate result is that the meter operates the same as if no heat were lost by the main heater and all of its heat were transmitted to and retained by the fluid until the temperature rise is measured. This auxiliary heater, in practice, is associated with the unit which contains the main heater resistance.

Figs. 2 and 3 show the heater unit as it is constructed in practice and show the auxiliary heater associated therewith.

In order to understand the present invention it is not necessary to know the detail construction of the heater unit. It is sufficient for the present purpose to note that the heater unit comprises a cylindrical frame or barrel 27 across the inner area of which is distributed the resistor 28, which constitutes the main heater for the fluid.

The resistor 28 is stretched across the frame 27 in two planes, as shown in Fig. 2.

A pair of terminal rods 29 extends transversely across the heater unit between the two planes of resistance wire 28. The end of each terminal rod is provided, at a point outside of the barrel or frame 27, with a binding post 30 to which an electrical conductor 31 may be connected. The two conductors 31 pass through bushings 32 to the interior of a terminal housing 33. The resistor 28 is electrically connected to the terminal rods 29 and receives its supply of energy from these terminal rods.

The auxiliary heater 24 in Figs. 2 and 3 is in the form of a cylindrical tube 34 passing transversely across the frame 27, either above or below the resistor 28. The tube 34 contains a resistor 35 which is electrically connected to the terminals 36 in the terminal housing 33. Conductors 37 supply energy to these terminals from the supply mains.

The tube 24 passes through the walls of the frame 27 and extends at one end into the terminal housing 33. The opposite end of the tube 34 is sealed by means of a plug 38.

In Fig. 4 the auxiliary heater 24 instead of being made straight and passed transversely across the interior of the frame 27 is curved to conform with the shape of the frame. The auxiliary heater may be constructed in the same manner and may be connected to the terminal housing 33 in the same manner as shown in Figs. 2 and 3.

The auxiliary heater is designed to impart to the fluid the amount of heat which is lost by radiation, conduction and other effects in the meter. The capacity of the auxiliary heater will depend largely upon conditions in practice and should be designed to supply the heat which is found to be actually lost in practice. As the amount of heat lost remains constant for all rates of flow, the auxiliary heater automatically compensates for this loss of heat at all times and the meter will read accurately for all rates of flow of the fluid.

The auxiliary heater may be constructed in various different ways and may be associated with the main heater in numerous different ways to produce the desired results. One form of auxiliary heater and one way of associating it with the heater unit are specifically described herein for illustrative purposes only and the specific description should not be construed in a limiting sense.

Furthermore, the auxiliary heater may be used in combination with thermal fluid meters of various types and is not limited in its use to a thermal fluid meter of the specific type herein disclosed.

What I claim is:—

1. A thermal fluid meter having a heater for imparting heat to the fluid, means to measure the amount of heat imparted to the fluid, and means to supply to the fluid an additional quantity of heat that is not measured by said first named means to compensate for the radiation and conduction heat losses that affect the accuracy of the meter.

2. A thermal fluid meter having a main heater for imparting heat to the fluid, means for measuring the amount of heat imparted to the fluid, an auxiliary heater for imparting to the fluid an additional quantity of heat that is not measured by said measuring means to compensate for the heat losses that affect the accuracy of the meter.

3. A thermal fluid meter having a main heater to import heat to the fluid, and an auxiliary heater adapted to supply an amount of heat to the fluid equal to the quantity of heat which is dissipated by the main heater and lost through conduction and radiation effects.

4. A thermal fluid meter having a main heater for imparting heat to the fluid, and an auxiliary heater adapted to dissipate heat to the fluid at a constant rate which is just sufficient to compensate for the heat losses that affect the accuracy of the meter.

5. A thermal fluid meter comprising a main heater, means for varying the energy supplied to said heater, means for measuring the energy supplied to said heater, and an auxiliary heater for imparting heat to the fluid to compensate for the heat losses that affect the accuracy of the meter, said auxiliary heater being supplied with electrical energy at a constant rate and being electrically connected so that said energy will not be measured by the energy means for measuring the energy supplied to the main heater.

6. A thermal fluid meter comprising a heater for imparting heat to the fluid, means for varying the supply of electrical energy to said heater to maintain a constant temperature rise in the fluid, and an auxiliary heater for imparting to the fluid an additional quantity of heat equal to the amount of the heat loss that affects the accuracy of the meter.

7. A thermal fluid meter comprising a heater for imparting heat to the fluid, temperature responsive devices responsive to the temperature of the fluid before and after being heated, means controlled by said temperature responsive devices for varying the energy supplied to said heater to maintain a constant temperature rise in the fluid between the points where said temperature responsive devices are located, means for measuring the energy supplied to said heater, and an auxiliary heater for imparting to the fluid a quantity of heat equal to the amount of the heat loss that affects the accuracy of the meter, said auxiliary heater being connected so that the energy supplied thereto is not measured by the means for measuring the energy supplied to the main heater.

8. A thermal fluid meter comprising a heater for imparting heat to the fluid, means for measuring the temperature of the fluid before it is heated, means for measuring the temperature of the fluid after it is heated, and means for imparting an additional quantity of heat to the fluid after it passes the first named temperature measuring means and before it reaches the last named temperature measuring means.

9. A thermal fluid meter comprising a heater for imparting heat to the fluid, thermometer resistances arranged on opposite sides of the heater, means for varying the energy supplied to the heater to maintain a constant temperature rise in the fluid between the points where said thermometer resistances are located, means to measure the energy supplied to said heater, and an auxiliary heater for imparting an addition quantity of heat to the fluid after it passes one thermometer resistance and before it reaches the other, said auxiliary heater being electrically connected so that the energy supplied thereto is not measured by said means for measuring the energy supplied to the main heater.

10. A thermal fluid meter comprising a heater for imparting heat to the fluid, thermometer resistances arranged on opposite sides of the heater, means for varying the energy supplied to the heater to maintain a constant temperature rise in the fluid between the points where said thermometer resistances are located, means to measure the energy supplied to said heater, and an auxiliary heater for imparting an additional quantity of heat to the fluid after it passes one thermometer resistance and before it reaches the other, said auxiliary heater being electrically connected so that the energy supplied thereto will remain substantially constant and so that such energy will not be measured by the means for measuring the energy supplied to the main heater.

11. A thermal fluid meter having means for imparting heat to the fluid, means for measuring the energy dissipated in the form of heat by said means, temperature responsive devices for controlling the supply of energy to said means, and auxiliary means for imparting an additional quantity of heat to the fluid, said additional quantity of heat being measured by the temperature responsive devices, and means for supplying energy to said auxiliary means which is not measured by the energy measuring means.

12. A thermal fluid meter having a heating unit comprising a main heater for imparting heat to the fluid and an auxiliary heater associated with said unit for imparting an additional quantity of heat to the fluid.

13. A thermal fluid meter having a heating unit comprising a main heater for imparting heat to the fluid and an auxiliary heater associated with said unit for imparting an additional quantity of heat to the fluid, means for varying the energy supplied to said main heater, and measuring means for measuring the energy supplied to said heater, the auxiliary heater being electrically connected so the energy supplied thereto will not be measured by said measuring means.

14. A thermal fluid meter having a heating unit comprising a main heater for imparting heat to the fluid and an auxiliary heater associated with said unit for imparting an additional quantity of heat to the fluid, means for varying the energy supplied to said main heater, and measuring means for measuring the energy supplied to said heater, said auxiliary heater being electrically connected so that energy will be supplied thereto at a substantially constant rate and so that the energy supplied thereto will not be measured by said measuring means.

15. A thermal fluid meter having a heater for imparting heat to the fluid, means for measuring the amount of heat imparted to the fluid by said heater, means for measuring the temperature effect on the fluid of the heat imparted by said heater, and means to supply to the fluid an additional quantity of heat whose effect on the fluid is measured by said last named means but the quantity of which is not measured by said first named means.

16. A thermal fluid meter having a heater for imparting heat to the fluid, means for imparting to the fluid an additional quantity of heat to compensate for the heat losses of heat to compensate for the accuracy of the meter, and means whereby the effect of the heat transfer between the heater and the fluid may be utilized in determining the rate of flow of the fluid, the additional quantity of heat being supplied independently of said last named means.

In witness whereof I have hereunto subscribed my name.

HORACE N. PACKARD.